(12) United States Patent
Ku et al.

(10) Patent No.: US 9,584,555 B2
(45) Date of Patent: *Feb. 28, 2017

(54) METHOD AND APPARATUS FOR MANAGING CALLS

(71) Applicant: AT&T INTELLECTUAL PROPERTY I, LP, Atlanta, GA (US)

(72) Inventors: Bernard Ku, Austin, TX (US); Lakshminarashimhan Naidu, Pearland, TX (US); Mehrad Yasrebi, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/965,063

(22) Filed: Dec. 10, 2015

(65) Prior Publication Data
US 2016/0094588 A1    Mar. 31, 2016

Related U.S. Application Data

(63) Continuation of application No. 13/234,036, filed on Sep. 15, 2011, now Pat. No. 9,241,258.

(51) Int. Cl.
| | |
|---|---|
| H04W 8/26 | (2009.01) |
| H04L 29/06 | (2006.01) |
| H04W 8/06 | (2009.01) |
| H04W 76/02 | (2009.01) |
| H04W 92/02 | (2009.01) |

(52) U.S. Cl.
CPC ...... *H04L 65/1033* (2013.01); *H04L 65/1016* (2013.01); *H04L 65/1069* (2013.01); *H04W 8/26* (2013.01); *H04W 8/06* (2013.01); *H04W 76/02* (2013.01); *H04W 92/02* (2013.01)

(58) Field of Classification Search
None
See application file for complete search history.

(56) References Cited

U.S. PATENT DOCUMENTS

| | | | |
|---|---|---|---|
| 6,741,585 B1 | 5/2004 | Munoz et al. | |
| 6,816,481 B1 | 11/2004 | Adams et al. | |
| 7,606,202 B2 | 10/2009 | Marathe et al. | |
| 7,787,445 B2 | 8/2010 | Marsico | |

(Continued)

*Primary Examiner* — Khaled Kassim
*Assistant Examiner* — Zhaohui Yang
(74) *Attorney, Agent, or Firm* — Guntin & Gust, PLC; Joseph Hrutka (57) ABSTRACT

A system that incorporates teachings of the present disclosure may include, for example, receiving a request for a voice call at a mobile switching center server, transmitting a mapping query from the mobile switching center server to a database in response to the request for the voice call, route the request from the mobile switching center server to an internet protocol multimedia subsystem for facilitating establishing the voice call when the mapping query is successful in obtaining an internet protocol address for establishing the voice call with a recipient communication device, and routing the request from the mobile switching center server to a second server for facilitating establishing the voice call without routing the request to the internet protocol multimedia subsystem when the mapping query is not successful in obtaining the internet protocol address. Other embodiments are disclosed.

20 Claims, 4 Drawing Sheets

(56) References Cited

U.S. PATENT DOCUMENTS

| | | |
|---|---|---|
| 8,325,905 B2 | 12/2012 | Gregorat |
| 8,400,947 B2 | 3/2013 | Heinze et al. |
| 9,241,258 B2 * | 1/2016 | Ku .................... H04W 8/26 |
| 2003/0081754 A1 | 5/2003 | Esparza |
| 2005/0170837 A1 | 8/2005 | Halsell |
| 2005/0286499 A1 | 12/2005 | Kobayashi et al. |
| 2007/0019545 A1 | 1/2007 | Alt et al. |
| 2007/0071221 A1 | 3/2007 | Allen et al. |
| 2008/0019356 A1 | 1/2008 | Marsico |
| 2008/0025492 A1 | 1/2008 | Heinze |
| 2008/0285543 A1 | 11/2008 | Qiu |
| 2009/0191871 A1 | 7/2009 | Siegel |
| 2010/0158201 A1 | 6/2010 | Marathe |
| 2011/0149750 A1 | 6/2011 | Sharma et al. |
| 2011/0292878 A1 | 12/2011 | Ozawa |
| 2013/0070737 A1 | 3/2013 | Ku et al. |

* cited by examiner

METHOD AND APPARATUS FOR MANAGING CALLS

CROSS-REFERENCE TO RELATED APPLICATIONS

This application is a continuation of U.S. patent application Ser. No. 13/234,036 filed Sep. 15, 2011 by Ku et al., entitled "Method and Apparatus for Managing Calls", now U.S. Patent Publication No. 2013/0070737. This application is related to U.S. application Ser. No. 13/234,016 entitled "METHOD AND APPARATUS FOR PROCESSING CALLS" filed on Sep. 15, 2011 by Ku et al., (now U.S. Pat. No. 8,693,464). All sections of the aforementioned applications are incorporated herein by reference in its entirety.

FIELD OF THE DISCLOSURE

The present disclosure relates generally to managing calls in a communication system.

BACKGROUND

End user devices can operate in numerous different systems that employ distinct communication protocols. It can be desirable to provide compatibility of these distinct systems and protocols. However, as existing systems and protocols evolve and as new systems and protocols are introduced, the complexity of establishing system and protocol compatibility grows.

DETAILED DESCRIPTION

One or more of the example embodiments described herein allow for completion of voice communications between first and second end user devices. A mobile switching center can route traffic between different subsystems in order to complete calls. This application is related to U.S. application Ser. No. 13/234,016 entitled "METHOD AND APPARATUS FOR PROCESSING CALLS" filed on Sep. 15, 2011 by Ku et al., (now U.S. Pat. No. 8,693,464). All sections of the aforementioned application are incorporated herein by reference in their entirety.

One embodiment of the present disclosure includes a mobile switching center server comprising a memory and a controller coupled to the memory. The controller can be operable to receive a request for a call associated with an originating communication end user device for a voice call, where the mobile switching center server is selected from a group of mobile switching center servers based on a local number portability database dip associated with the call. The controller can also be operable to transmit a tElephone NUmber Mapping (ENUM) query to a database in response to the request for the call. The controller can further be operable to route the request to an Interrogating Call Session Control Function (I-CSCF) of an Internet Protocol Multimedia Subsystem (IMS) network for establishing the call, when the query is successful in obtaining an internet protocol (IP) address for establishing the call with a recipient communication device on a network such as an IMS network. An IMS network can include components and perform functions that enable an end user device operating in a circuit-switched network to communicate with another end user device operating in a packet-switched network. An IMS network can be a network that supports both circuit-switched protocols and packet-switched protocols for establishing communication sessions. The controller can be operable to route the call request to another network for the recipient (target) end user device for establishing the call without routing the request to the I-CSCF of the IMS network, when the query is not successful in obtaining the internet protocol address.

One embodiment of the present disclosure includes a non-transitory computer-readable storage medium comprising computer instructions to receive a request for a voice call at a mobile switching center server, where the voice call is associated with an originating communication device. The computer instructions can enable transmitting a mapping query from the mobile switching center server to a database in response to the request for the voice call. The computer instructions can enable, when the mapping query is successful in obtaining an internet protocol address for establishing the voice call with a recipient communication device, routing the request from the mobile switching center server to an IMS network for establishing the voice call. The computer instructions can enable, when the mapping query is not successful in obtaining the internet protocol address, routing the request from the mobile switching center server to a recipient communications device on wireless network other than an IMS network.

One embodiment of the present disclosure is a method including receiving a request for a voice call at a mobile switching center server where the call is associated with an originating communication device, where the mobile switching center server is selected from a group of mobile switching center servers based on a local number portability database dip associated with the call. The method can also include, in response to the request for the call, transmitting a mapping query from the mobile switching center server to a database to obtain an internet protocol address for establishing the call with a recipient communication device. The method can further include routing the request to one of an IMS network or a non-IMS network based on a response to the mapping query provided by the database, monitoring call routing decisions for generating statistics related to the call routing decisions, and prioritizing a list of candidate end user devices for migration to the internet multimedia subsystem based on the statistics.

Figure 1:
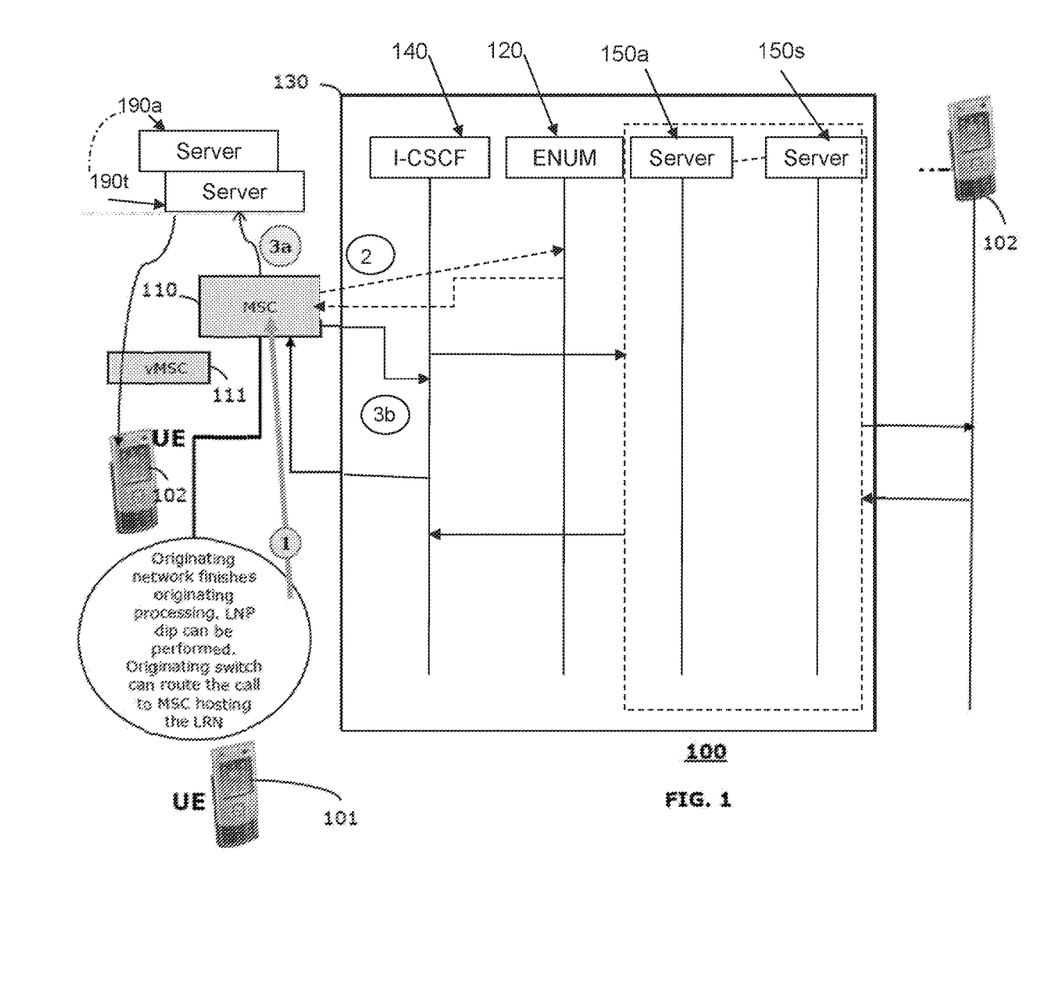
FIG. 1 depicts an illustrative embodiment of a call flow diagram of a communication system.

FIG. 1 depicts an illustrative embodiment of a call flow process in a communication system 100. System 100 can include a Mobile Switching Center (MSC) 110 (which can also be or otherwise operate as a Circuit Switch Gateway (CSG) 110) that can include various components, such as a server(s), for completing calls between an originating communication device 101 and one or more recipient or terminating communication devices 102. The MSC 110 can include various components, such as one or more servers. The recipient communication devices 102 can be associated with a subscriber of a system(s) operating according to various communication protocols, such as those for an IMS network, Long Term Evolution (LTE) network, Evolved Universal Terrestrial Radio Access Network (E-UTRAN), Universal Terrestrial Radio Access Network (UTRAN), and circuit-switched technologies such as circuit switched 2G or 3G Global System for Mobile communications (GSM).

The MSC 110 can perform various functions, including being the primary service delivery node for various communication formats, such as voice calls, Short Message Service (SMS) and/or facsimile services. In one embodiment, the MSC 110 can perform setting-up and releasing of end-to-end connections (e.g., depending on the type of recipient communication device, the originating network and/or the service plan associated with the device), mobility and hand-over requirements during a call, and/or real-time pre-paid account monitoring. In one embodiment, the MSC 110 can perform the function of a gateway mobile switching center and can determine or otherwise identify a Visited Mobile Switching Center (vMSC) 111 associated with the recipient communication device 102, such as based on location of the (end user) device 102. The MSC 110 can perform other functions, including generating billing information, delivering SMS messages to an SMS center, arranging handovers between base station controllers and/or other MSC's, and/or supporting other services, such as conference calls and call holding.

In one embodiment, the MSC 110 can interface with a Public Switched Telephone Network (PSTN) and/or can be selected from among a group of MSC's, such as based on hosting a Local Routing Number (LRN) associated with a circuit switch of the originating network of the communication (end user) device 101. In one embodiment, the MSC 110 can be selected from the group of MSC's based on a Local Number Portability (LNP) dip to obtain the LRN associated with the recipient communication device 102, and the originating switch can then route a voice call request to the MSC 110 hosting the LRN as indicated by arrow 1.

In response to the call request originating from the communication device 101, the MSC 110 can perform an ENUM query to an ENUM database 120 based on the telephone number of the recipient communication device 102 as indicated by arrow 2. If the ENUM database 120 provides a positive response (e.g., there is a successful Session Initiation Protocol (SIP) address resolution), then a SIP Uniform Resource Identifier (URI) can be obtained, which enables a Domain Name Server (DNS) query (not shown) to obtain a corresponding Internet Protocol address. The DNS query can also be performed by the MSC 110. The MSC 110 can then route the request to an Internet Protocol Multimedia Subsystem (IMS) network 130 for further call processing as indicated by arrow 3b (such as routing to the I-CSCF 140). It should be understood that the request can be of various forms, such as a SIP INVITE message or derivative thereof. The ENUM database 120 can be a database associated with the IMS network 130 as shown in FIG. 1 or can be independent of the IMS network 130. The ENUM database 120 can be configured to receive and respond to ENUM queries from various sources, such as the MSC 110, as well as other components, such as a Serving Call Session Control Function (S-CSCF).

Where the response to the ENUM query performed by the MSC 110 is negative (e.g., there is not a successful SIP address resolution), the MSC 110 can then route the request to one or more servers 190a-t as indicated by arrow 3a, which may perform one or more operations such as functioning as a mobility gateway. Servers 190a-t can further process the request including providing it to the vMSC 111 for completion of the call with the recipient communication device 102, which can be operating on a circuit switched network, such as a circuit switched GSM network. Functions of the servers 190a-t can be executed by one or more servers, including a general purpose computing device, and can be located at various places, including a central office of the service provider. Servers 190a-t may also include support for other call handling capabilities such as call forwarding, call waiting and last call return.

System 100 can include and/or interface with other components and perform other functions. For example, the network (IMS network, LTE network) 130 can include one or more other servers and other components (not shown), which may include services for, but are not limited to, for example, one or more instances of a Home Subscriber Server (HSS); a Proxy Call Session Control Function (P-CSCF); a Serving Call Session Control Function (S-CSCF) server; a Domain Naming Server; a Breakout Gateway Control Function (BGCF); a Session Border Controller (SBC); an application server; wired and/or wireless interface services (not shown), but can be coupled with and/or included in the example network 130) such as, for example, Evolved Universal Terrestrial Radio Access (EU-TRA), one or more forms of packet core functions (such as an Evolved Packet Core (EPC), radio network such as Evolved Universal Terrestrial Radio Access Network (EU-TRAN), wireless towers; etc.

In one embodiment, the S-CSCF server can perform a number of different functions, including exchanging messages with one or more application servers, which enable providing of a variety of services to the subscriber(s). The S-CSCF can perform other functions, including SIP registrations, message inspection, and/or service provider policy enforcement.

It should be further understood that while the exemplary embodiments describe recipient communication devices that can be IMS and/or circuit-switched devices, the present disclosure also contemplates the recipient devices operating in other types of systems that are based on other communication protocols. The exemplary embodiments can include the MSC 110 of FIG. 1 performing an ENUM query to determine whether the request should be diverted to a circuit switched network or an IMS network. The exemplary embodiments can divert calls among various systems, including circuit-switched and packet-switched networks, such as Code Division Multiple Access (CDMA) networks, Time Division Multiple Access (TDMA) networks, World interoperability for Microwave (WiMAX) networks, and/or Software Defined Radio (SDR) networks. Other present and next generation wide area wireless network technologies are contemplated by the present disclosure.

In one embodiment, system 100 can perform call flow processing and routing at the MSC 110 based on the ENUM query so that the IMS network 130 does not need to rely on a Breakout Gateway Control Function (BGCF) which is a SIP proxy that processes requests for routing from an S-CSCF when the S-CSCF has determined that the session cannot be routed using ENUM.

Various components or portions of system 100 can perform other call processing functions and can establish calls, including voice, video and/or messaging, using other techniques, in addition to the MSC 110 performing the ENUM query and routing traffic based on the response to the ENUM query. For instance, if an originating communication device is not operating in a circuit-switched network then the device may be able to connect with the IMS network 130 without utilizing the MSC 110 for performing the ENUM dip. In this example, the IMS network 130 may establish the call with an IMS-capable recipient device.

In one embodiment, the IMS network 130 of FIG. 1 can further employ a Media Gateway Control Function (MGCF) coupled to a PSTN network to selectively establish communications between IMS-compliant communication devices, PSTN communication devices, and combinations thereof. The MGCF may not be necessary or otherwise be utilized when a communication session involves IMS-compliant communication device to IMS-compliant communication device communications. A more detailed description of various other functions and/or components of the IMS network 130 can be found in U.S. Patent Application Publication No. 20090191871 and 20080285543, the disclosures of which are hereby incorporated by reference.

In one embodiment, the MSC 110 can store IP addresses as they are processed from the ENUM and DNS queries. The stored IP addresses can be utilized as described above to be utilized for call completion as the last updated IP address in the event of a call processing error.

In addition, communication system 100 can be adapted to provide the communication devices 102 with multimedia and Internet services. It is further contemplated that the communication devices of FIG. 1 can be communicatively coupled to an access point such as a femtocell (not shown), a WiFi router, a DECT base unit, or another suitable wireless access point to establish communications with the IMS network 130 of FIG. 1.

Figure 2:
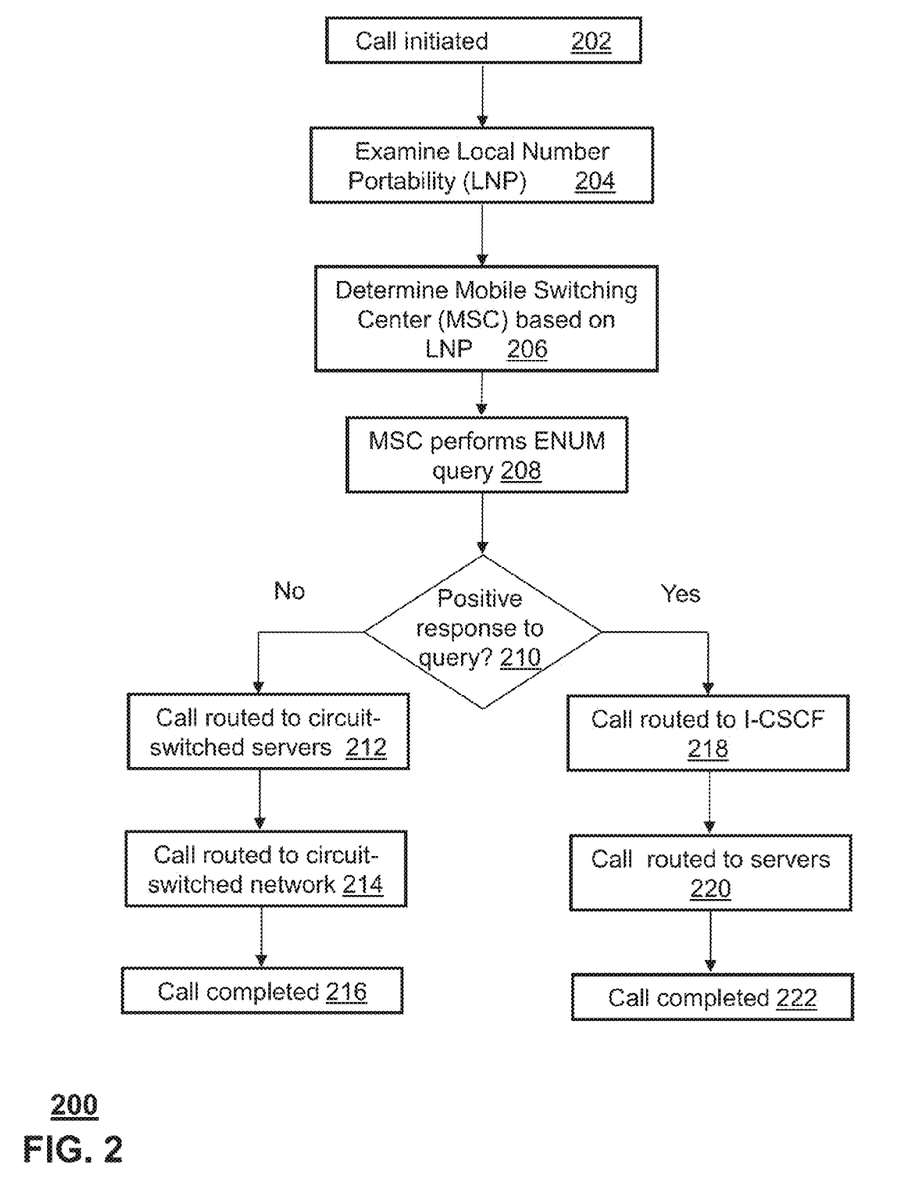
FIG. 2 depicts an illustrative embodiment of a method operating in portions of the system of FIG. 1.

FIG. 2 depicts an illustrative method 200 that can operate in conjunction with the call flow processing and the system of FIG. 1. At 202, a voice call can be initiated by an originating communication device (e.g., device 101 of FIG. 1) from an originating network. The call can be from various types of originating networks, including a network utilizing circuit-switching techniques and components, including an originating switch.

To route the call request to the recipient communication device (e.g., device 102 of FIG. 1), method 200 can select an MSC (e.g., MSC 110) from a group of available MSC's. In one embodiment at 204, the selection can be based on an LNP dip or examination of an LNP database. The LNP dip can be performed by various devices using various techniques, including the LNP dip being performed by a server of the originating network. At 206, an MSC (such as MSC 110) is selected from the group of available MSC's based on the LNP dip. For instance, the LNP dip can be utilized to determine or otherwise obtain the corresponding LRN for the requested call and the MSC hosting the determined LRN can be selected.

Method 200 can be utilized to route call requests between IMS-based systems and non-IMS based systems. In one embodiment, the criteria for routing can be based on the subscriber's service plan and/or the compatibility of the communication device(s) involved in the call. In one embodiment at 208, the MSC can perform an ENUM query of an ENUM database based on the call request, such as based on the telephone number of the recipient communication device. By utilizing the ENUM query, method 200 can provide up-to-date subscriber information, such as whether the subscriber has switched to a different service (e.g., switching from a circuit-switched service to an IMS service). The use of the ENUM query from the ENUM database 120 as the determinative factor for routing of a call request to an IMS network 130 or servers 190a-t can speed up the routing time, as opposed to having such a determination be made later within the IMS network 130. The ENUM query can include receiving a SIP URI response and requesting a corresponding IP address from a DNS server.

In one embodiment, when an end user device 102, which is capable of operating in both a circuit-switched environment and a packet environment such as an IMS network or an LTE network, and the end user device 102 is to be migrated over to an IMS network from a circuit-switched network (e.g., for better service), mapping information for that end user device 102 must be configured (provisioned) into the ENUM server 102 and the LRN of that end user device 102 must also be migrated to the IMS network 130. If the LRN of the device is migrated, but the mapping information is not configured into the ENUM server 120, then the IMS network 130 cannot successfully complete the call from the end user device 101 on the IMS network.

The exemplary embodiments also contemplate other techniques being utilized for determining where the call request should be routed (e.g., routed to the IMS network 130 or routed to the servers 190a-t). For instance in one embodiment, the MSC 110 can store results of ENUM queries for recipient end user devices 102 and can selectively base routing decisions on the stored results without performing an ENUM query. Time thresholds can be applied to the use of the stored ENUM query results to reduce the likelihood that the subscriber of the recipient device has migrated to a different service subsequent to the last ENUM query result. In this example, if the time threshold has not been met (e.g., the last ENUM query occurred too long ago for the particular recipient device) then the MSC 110 can perform the ENUM query. Other call request filtering schemes can also be employed, including distinguishing between call requests from circuit-switched originating networks and packet-switched originating networks and distinguishing between types of calls such as voice, messaging and video calls.

At 210, a determination can be made by the MSC 110 (e.g., a server at the MSC 110) as to whether there was a positive or negative result from the ENUM query (e.g., an IP address resolution was successful). If the ENUM query were negative (e.g., the IP address resolution was unsuccessful), then at 212 the call request can be routed by the MSC 110 to a circuit-switched network via servers 190a-t. The servers 190a-t can route, at step 214, such as via a vMSC (e.g., vMSC 111 selected based on the location of the recipient communication device) that is selected by the MSC 110, the request for completion of the call at 216.

Returning to step 210, if on the other hand the ENUM query were positive (e.g., the IP address resolution was successful), then at 218 the call request can be routed by the MSC 110 to the IMS (or LTE) network 130 (e.g., arrow 3b in FIG. 1). For instance, the call request can be routed to an I-CSCF (e.g., I-CSCF 140) which then, at step 220, can attempt to complete the call according to the applicable implemented protocols (for example, the call request can be forwarded to server(s) 150a-s for processing and delivery to end user device 102 on a network such as an LTE or IMS network). The call may then be completed at step 222.

One or more of the example embodiments can include one or more of the servers 150a-s performing various functions or operating as various components of the IMS network 130, including operating as an HSS server, an application server, an S-CSCF server and/or a P-CSCF server. In this example, the servers 150a-s can combine IMS functionality and/or can be dedicated devices.

In one embodiment, one or more of the server(s) 150a-s can function as an S-CSCF which can route the request to a Proxy Call Session Control Function (P-CSCF). The P-CSCF can be combined with other devices and/or functionality of the IMS network 130, such as a Session Border Controller (SBC), Access Transfer Gateway (ATG), and/or Access Transfer Control Function (ATCF). The P-CSCF can perform various other functions, including subscriber authentication, security association (e.g., IPsec or TLS), signal inspection, message compression and decompression, policy enforcement (e.g., network routing policy or bandwidth management), and/or generating charging records.

In one embodiment, the routing of calls by the MSC 110 can be monitored and utilized in determining a migration strategy for subscribers. For instance, end user devices 102 that are more often contacted through the servers 190a-t for call completion may be migrated to an IMS-based system, such as an LTE service, before other communication devices that are contacted less often through the servers 190a-t for call completion. In one embodiment, an MSC 110 can monitor routing decisions, collect routing statistics about traffic routing, can prepare a prioritized list of end user devices 102, and can report (for example, using an administrative interface) such a prioritized list, which can be used for prioritized migrations of end user devices and/or subscribers. In one embodiment, an interface of the MSC 110 can provide a prioritized list of candidate end user devices 102 to a recipient device or system for performing, confirming or otherwise processing the migration of at least a portion of the candidates on the list. The exemplary embodiments can include other devices that monitor the decisions, generate statistics and/or generate the prioritized list. Various techniques can be utilized in generating the statistics based on various factors, such as an end user's frequency of use, cost of migration, cost of non-migration, geographic region and so forth.

Figure 3:
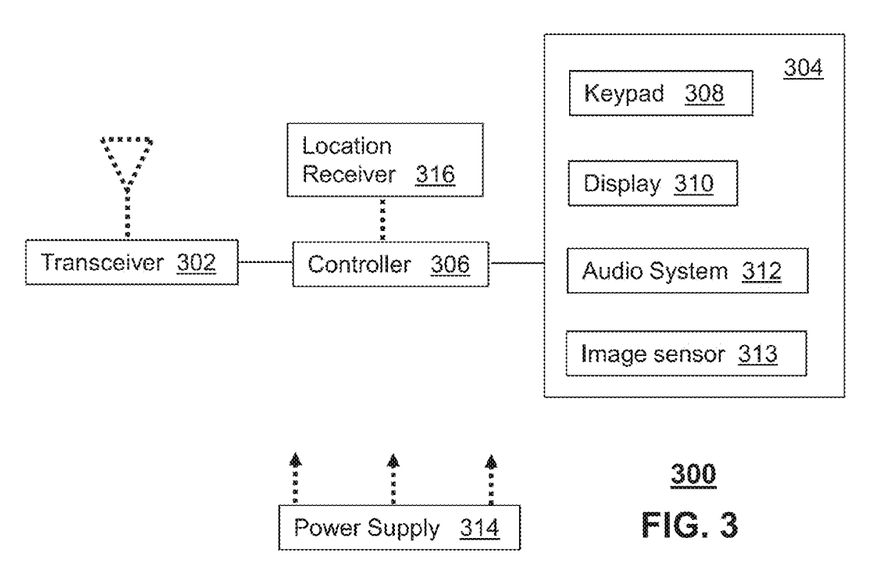
FIG. 3 depicts an illustrative embodiment of a communication device utilized in the communication system of FIG. 1.

FIG. 3 depicts an exemplary embodiment of a communication device 300. Communication device 300 can serve in whole or in part as an illustrative embodiment of user endpoint devices depicted in FIG. 1. The communication device 300 can function as a caller or callee's end user device that can participate in a completed voice call and/or messaging session despite the compatibility of the devices and/or the compatibility of the networks in which the devices are operating. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), and/or other cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation cellular wireless communication technologies as they arise. The transceiver 302 can also be adapted to support circuit-switched wireline access technologies (such as PSTN), packet-switched wireline access technologies (such as various forms of IEEE 802.11 networking technologies, TCP/IP, VoIP, etc.), and combinations thereof.

The UI 304 can include a depressible or touch-sensitive keypad 308 with a navigation mechanism such as a roller ball, a thumbwheel, a joystick, a mouse, or a navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys used by smart phones. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display 310 with navigation features.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver capable of assisted GPS for identifying a location of the communication device 300 based on signals generated by a constellation of GPS satellites, thereby facilitating common location services such as navigation.

The communication device 300 can use the transceiver 302 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the communication or user end point devices of FIG. 1. It will be appreciated that the communication device 300 can also represent other common devices that can operate in communication system 100 of FIG. 1.

Upon reviewing the aforementioned embodiments, it would be evident to an artisan with ordinary skill in the art that said embodiments can be modified, reduced, or enhanced without departing from the scope and spirit of the claims described below.

Figure 4:
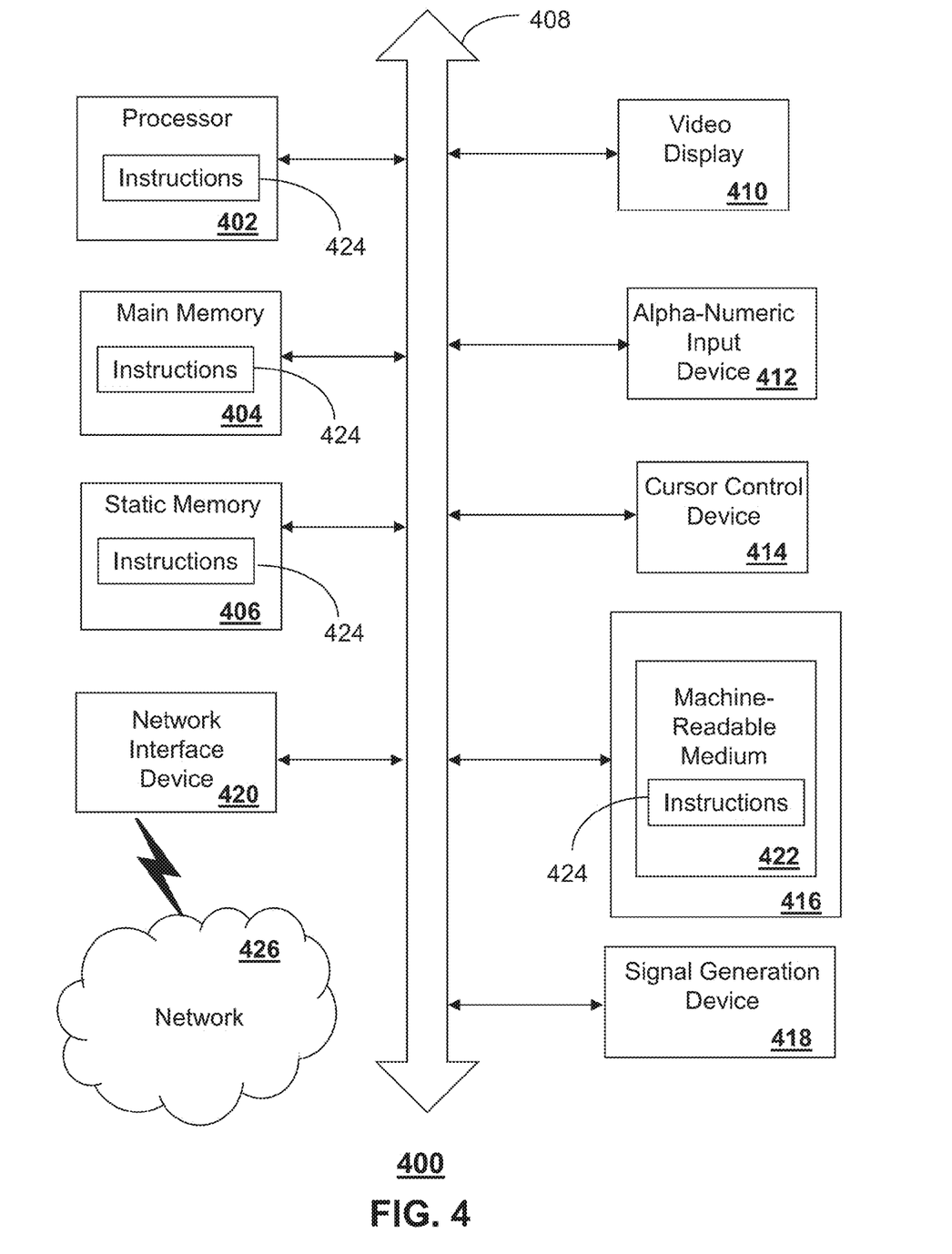
FIG. 4 is a diagrammatic representation of a machine in the form of a computer system within which a set of instructions, when executed, may cause the machine to perform any one or more of the methods disclosed herein.

FIG. 4 depicts an exemplary diagrammatic representation of a machine in the form of a computer system 400 within which a set of instructions, when executed, may cause the machine to perform any one or more of the methods discussed above. One or more instances of the machine can operate, for example, as the devices of FIG. 1, including the MSC 110 to perform ENUM queries and/or divert call flow traffic based on the ENUM query. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, or a solid state display. The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a tangible computer-readable storage medium 422 on which is stored one or more sets of instructions (e.g., software 424) embodying any one or more of the methods or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 422 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., LTE, WiMAX, GSM, CDMA) are contemplated for use by computer system 400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile switching center server, comprising:
  a processing system including a processor; and
  a memory that stores executable instructions that, when executed by the processing system, facilitate performance of operations, comprising:
  determining, as a first determination, whether a recipient communication device for a voice call supports circuit-switched and packet-switched communication protocols;
  updating a database of the mobile switching center server based on the first determination;
  determining, as a second determination, whether an internet protocol address is available for establishing the voice call with the recipient communication device according to information stored in the database of the mobile switching center server without performing a telephone number mapping query, wherein the information stored in the database of the mobile switching center server is updated by querying a telephone number mapping server after an expiration of a time threshold;
    transmitting the telephone number mapping query to the telephone number mapping server for determining whether the internet protocol address is available for establishing the voice call with the recipient communication device after the expiration of the time threshold; and
    storing updated information associated with the telephone number mapping query in the database of the mobile switching center server and reinitiating the expiration of the time threshold responsive to storing the updated information,
  wherein, when the internet protocol address is determined to be available for establishing the voice call with the recipient communication device, facilitating establishment of the voice call via a first network supporting circuit-switched and packet-switched communication protocols; and
  wherein, when the internet protocol address is determined to be unavailable for establishing the voice call with the recipient communication device, facilitating establishment of the voice call via a second network that does not support both of the circuit-switched and packet switched communication protocols.

2. The mobile switching center server of claim 1, wherein the operations further comprise:
  routing a request for the voice call to an interrogating call session control function of the first network when the query is successful in obtaining the internet protocol address, wherein the first network comprises an internet protocol multimedia subsystem.

3. The mobile switching center server of claim 2, wherein when the query is successful in obtaining the internet protocol address, the interrogating call session control function routes the request to a serving call session control function of the internet protocol multimedia subsystem.

4. The mobile switching center server of claim 1, wherein the voice call is routed to a visited mobile switching center corresponding to a location of the recipient communication device for completing the voice call with the recipient communication device operating in a global system for mobile communications network when the internet protocol address is determined to be unavailable.

5. The mobile switching center server of claim 1, wherein call routing decisions associated with the first and second networks are monitored, and wherein a list of candidate subscribers is generated based on the call routing decisions being monitored for migration to an internet protocol multimedia subsystem.

6. The mobile switching center server of claim 1, wherein the operations further comprise transmitting a telephone number mapping query to a database for determining whether the internet protocol address is available for establishing the voice call with the recipient communication device.

7. The mobile switching center server of claim 1, wherein a request for the voice call is received by the processor via circuit switching, and wherein the mobile switching center server is selected from a group of mobile switching center servers based on a number portability database dip associated with the voice call.

8. The mobile switching center server of claim 1, wherein the operations further comprise transmitting a domain name system query to a database for determining whether the internet protocol address is available for establishing the voice call with a recipient communication device.

9. A non-transitory computer-readable storage medium comprising executable instructions that, when executed by a processing system including a processor, facilitate performance of operations, comprising:
  receiving a request for a voice call at a mobile switching center server, the voice call being associated with an originating communication device;
  determining whether an internet protocol address is available for establishing the voice call with a recipient communication device according to information stored in a local database of the mobile switching center server prior to expiration of a timer, wherein the information stored in the local database of the mobile switching center server is updated, as updated information, by querying a telephone number mapping server after an expiration of the timer;
  providing a mapping query from the mobile switching center server to the telephone number mapping server in response to the request for the voice call after the expiration of the timer; and
  storing the updated information associated with the mapping query in the local database of the mobile switching center server and reinitiating the timer responsive to storing the updated information,
  wherein, when the internet address is available in the local database or the mapping query is successful in obtaining the internet protocol address for establishing the voice call with the recipient communication device, the request is routed from the mobile switching center server to an internet protocol multimedia subsystem for facilitating establishing the voice call and
  wherein, when the internet address is not available in the local database or the mapping query is not successful in obtaining the internet protocol address, the request is routed from the mobile switching center server to a second network for facilitating establishing the voice call without routing the request to the internet protocol multimedia subsystem.

10. The non-transitory computer-readable storage medium of claim 9, wherein the operations further comprise routing the request from the mobile switching center server to an interrogating call session control function of the internet protocol multimedia subsystem for facilitating establishment of the voice call when the mapping query is successful in obtaining the internet protocol address.

11. The non-transitory computer-readable storage medium of claim 9, wherein when the mapping query is successful in obtaining the internet protocol address, a serving call session control function of the internet protocol multimedia subsystem facilitates completing the voice call with the recipient communication device operating in a long term evolution network.

12. The non-transitory computer-readable storage medium of claim 9, wherein the request is routed to the mobile switching center server via circuit switching, and wherein the mobile switching center server is selected from a group of mobile switching center servers based on hosting a local routing number for the circuit switching.

13. The non-transitory computer-readable storage medium of claim 9, wherein the mapping query comprises a telephone number mapping query and a domain name system query.

14. The non-transitory computer-readable storage medium of claim 9, wherein the second network routes the request via a visited mobile switching center for completing the voice call with the recipient communication device operating in a global system for mobile communications network when the mapping query is not successful in obtaining the internet protocol address, wherein the visited mobile switching center corresponds to a location of the recipient communication device.

15. The non-transitory computer-readable storage medium of claim 9, wherein call routing decisions associated with the internet protocol multimedia subsystem and the second network are monitored, and wherein a list of candidate subscribers is generated based on the call routing decisions being monitored for migration to a Long Term Evolution network.

16. A method, comprising:
   receiving, by a processing system comprising a processor, a request for a voice call at a mobile switching center server, the voice call being associated with an originating communication device and a recipient communication device;
   determining, by the processing system, whether a recipient communication device for the voice call supports circuit-switched and packet-switched communication protocols;
   updating, by the processing system, a local database of the mobile switching center server based on the determination;
   determining, by the processing system, whether an internet protocol address is available for establishing the voice call with a recipient communication device according to information stored in the local database of the mobile switching center server, wherein the information is updated to be updated information by querying a telephone number mapping server after an expiration period;
   storing, by the processing system, the updated information associated with the querying the telephone number mapping server in the local database of the mobile switching center server and reinitiating the expiration period responsive to storing the updated information;
   routing, by the processing system, the request to one of a first network that supports communication sessions between an end user device in a circuit-switched network and an end user device in a packet-switched network or a second network that does not support communication sessions between the end user device in the circuit-switched network and the end user device in the packet-switched network, wherein the routing is based on an availability of an internet protocol address for establishing the voice call;
   monitoring, by the processing system, call routing decisions associated with the first and second networks for generating statistics related to the call routing decisions; and
   prioritizing, by the processing system, a list of candidate end user devices for migration to an internet protocol multimedia subsystem based on the statistics.

17. The method of claim 16, further comprising migrating a portion of the candidate end user devices from the list of candidate end user devices to the first network that comprises the internet protocol multimedia subsystem.

18. The method of claim 16, further comprising providing the list of candidate end user devices over an interface of the mobile switching center server.

19. The method of claim 16, further comprising:
   in response to the request for the voice call, providing a mapping query from the mobile switching center server to a database to obtain the internet protocol address; and
   routing the request to an interrogating call session control function of the first network for facilitating establishment of the voice call when the mapping query is successful in obtaining the internet protocol address.

20. The method of claim 16, further comprising:
   in response to the request for the voice call, providing a mapping query from the mobile switching center server to the telephone number mapping server to obtain the internet protocol address; and
   wherein the routing comprises routing the request to the second network when the mapping query is not successful in obtaining the internet protocol address.

\* \* \* \* \*